US012616952B2

(12) United States Patent
Wang et al.

(10) Patent No.: US 12,616,952 B2
(45) Date of Patent: May 5, 2026

(54) ALUMINUM BASE LITHIUM ION ADSORBENT, METHOD FOR PREPARING SAME BY LIQUID-PHASE PRECIPITATION

(71) Applicant: BYD COMPANY LIMITED, Shenzhen (CN)

(72) Inventors: Minghao Wang, Shenzhen (CN); Junlan Lian, Shenzhen (CN); Hongye Lin, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 1093 days.

(21) Appl. No.: 17/690,326

(22) Filed: Mar. 9, 2022

(65) Prior Publication Data

US 2023/0091794 A1 Mar. 23, 2023

(30) Foreign Application Priority Data

Sep. 18, 2021 (CN) .......................... 202111101864.9

(51) Int. Cl.
| | | |
|---|---|---|
| *B01J 20/08* | (2006.01) | |
| *B01J 20/28* | (2006.01) | |
| *B01J 20/30* | (2006.01) | |

(52) U.S. Cl.
CPC ......... *B01J 20/08* (2013.01); *B01J 20/28059* (2013.01); *B01J 20/28071* (2013.01); *B01J 20/28083* (2013.01); *B01J 20/3071* (2013.01); *B01J 2220/42* (2013.01)

(58) Field of Classification Search
CPC .................. B01J 20/28069; B01J 20/08; B01J 20/28059; B01J 20/28071; B01J 20/28083
See application file for complete search history.

(56) References Cited

U.S. PATENT DOCUMENTS 8,637,428 B1 * 1/2014 Harrison ............ B01J 20/28078
502/526
2017/0333867 A1 11/2017 Cheng et al.

FOREIGN PATENT DOCUMENTS

| CN | 103285808 A | 9/2013 | |
|---|---|---|---|
| CN | 106435220 A | 2/2017 | |
| CN | 107930575 A | 4/2018 | |
| CN | 108543514 A | 9/2018 | |
| CN | 108854935 A | 11/2018 | |
| CN | 109200987 A | 1/2019 | |
| CN | 110102273 A * | 8/2019 | .............. B01J 20/08 |
| CN | 110102273 A | 8/2019 | |
| CN | 112808226 A | 5/2021 | |
| JP | 2012200653 A | 10/2012 | |

* cited by examiner

*Primary Examiner* — Anthony J Zimmer
*Assistant Examiner* — Eric Scott Sherman
(74) *Attorney, Agent, or Firm* — Wenye Tan

(57) ABSTRACT

A lithium ion adsorbent includes a material having a chemical formula of $LiCl \cdot 2Al(OH)_3 \cdot nH_2O$. n is an integer from 1 to 3, a specific surface area of the lithium ion adsorbent is 20-36 $m^2/g$, an average pore diameter of the lithium ion adsorbent is 20-35 nm, a total pore volume of the lithium ion adsorbent is 0.15-0.32 mL/g, a D10 of the lithium ion adsorbent is 3-12 μm, a D50 of the lithium ion adsorbent is 12-22 μm, and a D90 of the lithium ion adsorbent is 20-40 μm.

4 Claims, No Drawings

ALUMINUM BASE LITHIUM ION ADSORBENT, METHOD FOR PREPARING SAME BY LIQUID-PHASE PRECIPITATION

CROSS-REFERENCE TO RELATED APPLICATIONS

This application claims priority to Chinese Patent Application No. 202111101864.9, entitled "ALUMINUM BASE LITHIUM ION ADSORBENT, METHOD FOR PREPARING THE SAME BY LIQUID-PHASE PRECIPITATION" filed with the China National Intellectual Property Administration on Sep. 18, 2021, which is incorporated by reference in its entirety.

FIELD

The disclosure relates to the field of chemistry, and in particular, to an aluminum base lithium ion adsorbent and a method for preparing the same by liquid phase precipitation.

BACKGROUND

At present, there are mainly three methods for preparing an aluminum base lithium ion adsorbent. In a first method, a mixture of $AlCl_3$ and LiCl solutions is slowly added into a NaOH solution and reacted to form $Al(OH)_3$, where $Li^+$ is embedded in the interlayer of $Al(OH)_3$ to form $LiCl·2Al(OH)_3·nH_2O$. Although the adsorption capacity of the adsorbent prepared by this method is acceptable, three raw materials are needed for synthesis, and NaOH is a strong base, which leads to high difficulty in controlling the $Al(OH)_3$ formation process and imposes high requirements on the control of the pH value, resulting in complex operations and making it difficult to achieve large-scale industrial production. In a second method, a mixture of $AlCl_3$ and LiCl solutions is added to a bicarbonate solution, and through the hydrolysis of bicarbonate and aluminum ions, an aluminum ion adsorbent is generated in one step, which is reacted by heating to obtain a suspension containing $LiCl·2Al(OH)_3·nH_2O$. Then solid-liquid separation is performed to obtain the adsorbent. This method also requires three raw materials for synthesis, and a large amount of $CO_2$ is emitted during the synthesis process, leading to high carbon emission. In a third method, $Al(OH)_3$ particles are placed in a LiOH solution, so that LiOH infiltrates into the gaps of the $Al(OH)_3$ particles. Then HCl is added to adjust the pH value of the solution. Finally, $LiCl·2Al(OH)_3·nH_2O$ is formed after aging treatment. The adsorbent prepared by this method has low adsorption capacity and low desorption efficiency, and requires higher temperature and longer time for desorption.

Therefore, the lithium ion adsorption capacities of the adsorbents obtained by the above methods are still low.

SUMMARY

An objective of the disclosure is to provide a lithium ion adsorbent and a method for preparing the same. This method can overcome the problem of low lithium ion adsorption capacity in the related art.

The inventors of the disclosure found that the adsorbent precursor can be synthesized by a one-step method of liquid phase precipitation and the synthesis process is simple and suitable for industrial production, and thus obtained the disclosure.

In order to achieve the above objective, a first aspect of the disclosure provides a lithium ion adsorbent, which includes a material having a chemical formula of $LiCl·2Al(OH)_3·nH_2O$, where n is an integer from 1 to 3.

A specific surface area of the lithium ion adsorbent is 20-36 $m^2/g$.

An average pore diameter of the lithium ion adsorbent is 20-35 nm.

A total pore volume of the lithium ion adsorbent is 0.15-0.32 mL/g.

A D10 of the lithium ion adsorbent is 3-12 μm.

A D50 of the lithium ion adsorbent is 12-22 μm.

A D90 of lithium ion adsorbent is 20-40 μm.

According to some embodiments of the disclosure, the specific surface area of the lithium ion adsorbent is 33-36 $m^2/g$.

According to some embodiments of the disclosure, the average pore diameter of the lithium ion adsorbent is 22-24 nm.

According to some embodiments of the disclosure, the total pore volume of the lithium ion adsorbent is 0.28-0.32 mL/g.

According to some embodiments of the disclosure, the D10 of the lithium ion adsorbent is 3-6 μm.

According to some embodiments of the disclosure, the D50 of the lithium ion adsorbent is 12-16 μm.

According to some embodiments of the disclosure, the D90 of the lithium ion adsorbent is 20-29 μm.

According to some embodiments of the disclosure, a lithium ion adsorption capacity of the lithium ion adsorbent is 3-10 mg/g; a lithium ion desorption rate of the lithium ion adsorbent is 95-100%.

According to some embodiments of the disclosure, the lithium ion adsorption capacity of the lithium ion adsorbent is 8-10 mg/g.

According to some embodiments of the disclosure, the lithium ion desorption rate of the lithium ion adsorbent is 98-99%.

When the lithium ion adsorbent is used for adsorbing lithium ions in a brine including magnesium and lithium, a ratio of a mass ratio of magnesium to lithium in the brine to a mass ratio of magnesium to lithium in a desorption solution is 18-68:1; a content of the material having the chemical formula of $LiCl·2Al(OH)_3·nH_2O$ in the lithium ion adsorbent is 95-100% by weight.

A second aspect of the disclosure provides a method for preparing a lithium ion adsorbent, including the following steps: S1, adding a lithium salt solution to a metaaluminate solution or adding the metaaluminate solution to the lithium salt solution, and performing a first stirring, a first aging and a first filtration to obtain a precursor having a chemical formula of $LiOH·2Al(OH)_3·nH_2O$, where n is an integer from 1 to 3; S2, mixing the precursor with an acid and controlling the amount of the acid added to obtain a mixture with a pH value of 6.0-7.0, and performing a second stirring, a second aging and a second filtration to obtain a residue after the second filtration; and S3, treating the residue obtained from the second filtration by 1 to 3 cycles of pre-desorption and filtration.

According to some embodiments of the disclosure, in the step S1, a concentration of the lithium salt solution is 0.5-5 mol/L, a concentration of the metaaluminate solution is 0.5-2 mol/L, a molar ratio of Li in the lithium salt solution to Al in the metaaluminate solution is 1-1.3:2.

According to some embodiments of the disclosure, in the step S1, the concentration of the lithium salt solution is 4-5 mol/L, the concentration of the metaaluminate solution is 1.5-2 mol/L, the stirring temperature is 40-60° C., and the aging time is 1-2 h.

When the lithium salt solution is added to the metaaluminate solution, the metaaluminate solution is stirred at 100-500 rpm, the lithium salt solution is added with a flow rate of 0.02-5 L/min, and the amount of the lithium salt solution added is 0.05-2.6 L per liter of the metaaluminate solution.

When the metaaluminate solution is added to the lithium salt solution, the lithium salt solution is stirred at 100-500 rpm, the metaaluminate solution is added with a flow rate of 0.02-5 L/min, and the amount of the metaaluminate solution added is 0.38-20 L per liter of the lithium salt solution.

According to some embodiments of the disclosure, in the first stirring, a stirring time is 30-120 min, a stirring speed is 100-500 rpm, and a stirring temperature is 10 to 90° C.

According to some embodiments of the disclosure, in the first aging, an aging temperature is 5-30° C., and an aging time is 1-12 h.

According to some embodiments of the disclosure, in the first filtration, a mesh number of a filter cloth is 1000-5000, and a negative pressure of the first filtration is 0.04-0.07 MPa.

According to some embodiments of the disclosure, the method further includes: subjecting a residue obtained from the first filtration to 1 to 3 cycles of washing-filtration, i.e., performing 1 to 3 cycles of washing-filtration with the residue obtained from the first filtration before mixing the residue obtained from the first filtration with the acid; and/or performing 1 to 3 cycles of washing-filtration with the residue obtained from the second filtration before performing the cycle of pre-desorption and filtration.

According to some embodiments of the disclosure, the cycle of washing-filtration includes a first washing and a fourth filtration performed in sequence; the first washing is accompanied with stirring; in the first washing, a washing temperature is 5-30° C., a washing time is 3-15 min, a stirring speed is 100-300 rpm, a weight ratio of the residue obtained from the first filtration to pure water is 1:5-50; and in the first filtration, a mesh number of a filter cloth is 1000-5000, and a negative pressure of the first filtration is 0.04-0.07 MPa.

According to some embodiments of the disclosure, in the step S2, a concentration of the acid is 0.5-3 mol/L.

According to some embodiments of the disclosure, in the second stirring, a stirring time is 30-120 min, and a stirring speed is 100-500 rpm.

According to some embodiments of the disclosure, in the second aging, an aging temperature is 5-30° C., and an aging time is 1-12 h.

According to some embodiments of the disclosure, in the second filtration, a mesh number of a filter cloth is 1000-5000 meshes, and a negative pressure of the second filtration is 0.04-0.07 MPa.

According to some embodiments of the disclosure, in the step S2, the aging time is 11-12 h.

According to some embodiments of the disclosure, in the step S3, the cycle of pre-desorption and filtration comprises pre-desorption and a third filtration performed in sequence, wherein in the pre-desorption, a weight ratio of the residue obtained from the second filtration to pure water for pre-desorption is 1:5-100, the pre-desorption is accompanied with stirring, a pre-desorption temperature is 30-50° C., a pre-desorption time is 2-6 h, and a stirring speed is 100-500 rpm.

According to some embodiments of the disclosure, in the third filtration, a mesh number of a filter cloth is 1000-5000, and a negative pressure of the third filtration is 0.04-0.07 MPa.

According to some embodiments of the disclosure, a lithium desorption rate of the cycle of pre-desorption and filtration is 50-80%.

According to some embodiments of the disclosure, the method further includes: drying a residue obtained from the cycles of the pre-desorption and filtration.

According to some embodiments of the disclosure, in the drying include, a drying temperature is 70-90° C., and a drying time is 120-180 min.

Through the above technical solution, the method of the disclosure can generate the adsorbent precursor from the lithium salt and the metaaluminate through a one-step method, with high conversion rate and easy control, and an adsorbent with good adsorption performance can be produced in a short period of time, achieving a high production efficiency. In the synthesis process of the method of the disclosure, the main synthesis steps include only simple processes such as mixing, precipitation, stirring, and filtration, no complicated equipment is required, the operation is simple and easy to control, and low investment in production equipment is required. For the process of synthesizing the adsorbent precursor by a one-step method of liquid phase precipitation, the synthesis process is simple and suitable for industrial production. In addition, the liquid phase synthesis process of the disclosure is low-carbon, energy-saving and environmentally friendly, and the entire synthesis process is green and environmentally friendly, and has no pollutant emissions. The adsorbent with excellent performance can be prepared at room temperature, and the energy consumption is low compared with the high-temperature solid-phase method. The lithium ion adsorbent of the disclosure is of large specific surface area, high porosity, high adsorption-desorption efficiency, and large adsorption capacity. In addition, the lithium ion adsorbent of the disclosure is of a small pore size and high lithium selectivity. Moreover, the lithium ion adsorbent of the disclosure is of a stable adsorbent structure and good cycle stability. Furthermore, the synthesis process of the lithium ion adsorbent of the disclosure features high conversion rate, high lithium utilization and high production efficiency.

Other features and advantages of the disclosure will be described in detail in the following detailed description part.

DETAILED DESCRIPTION

Specific implementations of the disclosure are described in detail below. It should be understood that the specific implementations described herein are merely used to describe and explain the disclosure, but are not intended to limit the disclosure.

According to a first aspect, a lithium ion adsorbent is provided, which includes a material having a chemical formula of $LiCl \cdot 2Al(OH)_3 \cdot nH_2O$, where n is an integer from 1 to 3.

A specific surface area of the lithium ion adsorbent may be 20-36 $m^2/g$.

An average pore diameter of the lithium ion adsorbent may be 20-35 nm.

A total pore volume of the lithium ion adsorbent may be 0.15-0.32 mL/g.

A D10 of the lithium ion adsorbent may be 3-12 $\mu m$.

A D50 of the lithium ion adsorbent may be 12-22 $\mu m$.

A D90 of the lithium ion adsorbent may be 20-40 $\mu m$.

According to some embodiments of the disclosure, the specific surface area of the lithium ion adsorbent is 33-36 $m^2/g$.

According to some embodiments of the disclosure, the average pore diameter of the lithium ion adsorbent is 22-24 nm.

According to some embodiments of the disclosure, the total pore volume of the lithium ion adsorbent is 0.28-0.32 mL/g.

According to some embodiments of the disclosure, the D10 of the lithium ion adsorbent is 3-6 μm.

According to some embodiments of the disclosure, the D50 of the lithium ion adsorbent is 12-16 μm.

According to some embodiments of the disclosure, the D90 of the lithium ion adsorbent is 20-29 μm.

According to some embodiments of the disclosure, a lithium ion adsorption capacity of the lithium ion adsorbent may be 3-10 mg/g; and a lithium ion desorption rate of the lithium ion adsorbent may be 95-100%.

According to some embodiments of the disclosure, the lithium ion adsorption capacity of the lithium ion adsorbent is 8-10 mg/g.

According to some embodiments of the disclosure, the lithium ion desorption rate of the lithium ion adsorbent is 98-99%.

When the lithium ion adsorbent is used for adsorbing lithium ions in brine containing magnesium and lithium, the ratio of the mass ratio of magnesium to lithium in the brine to the mass ratio of magnesium to lithium in the desorption solution may be 18-68:1.

The content of the material having the chemical formula of $LiCl \cdot 2Al(OH)_3 \cdot nH_2O$ in the lithium ion adsorbent is 95-100% by weight.

A second aspect of the disclosure provides a method for preparing a lithium ion adsorbent, including the following steps: S1, adding a lithium salt solution to a metaaluminate solution or adding the metaaluminate solution to the lithium salt solution, and performing a first stirring, a first aging and a first filtration to obtain a precursor having a chemical formula of $LiOH \cdot 2Al(OH)_3 \cdot nH_2O$, where n is an integer from 1 to 3; S2, mixing the precursor with an acid for precursor conversion and controlling the amount of the acid added to obtain a mixture with a pH value of 6.0-7.0, and performing a second stirring, a second aging and a second filtration to obtain a residue $LiCl \cdot 2Al(OH)_3 \cdot nH_2O$ of the second filtration, where n is an integer from 1 to 3; and S3, treating the residue obtained from the second filtration by 1 to 3 cycles of pre-desorption and filtration.

The materials for synthesizing the precursor of the lithium ion adsorbent in the disclosure may include a lithium salt and a metaaluminate. The lithium salt may be at least one of a soluble lithium salt such as lithium chloride, lithium sulfate, lithium nitrate, or lithium acetate. The metaaluminate may be sodium metaaluminate or potassium metaaluminate.

The lithium salt solution described in the disclosure may be obtained by dissolving at least one of a soluble lithium salt such as lithium chloride, lithium sulfate, lithium nitrate, or lithium acetate in pure water at a temperature of room temperature to 90° C. and a stirring speed of 100-500 rpm until the solution is clear and transparent. The metaaluminate described in the disclosure may be obtained by dissolving sodium metaaluminate or potassium metaaluminate in pure water at a temperature of room temperature to 90° C. and a stirring speed of 100-500 rpm until the solution is clear and transparent. When the solution is clear and transparent, it indicates that the lithium salt or metaaluminate is completely dissolved.

According to some embodiments of the disclosure, for the addition of the lithium salt solution to the metaaluminate solution or the addition of the metaaluminate solution to the lithium salt solution, the mixing mode may be any of the following three mixing modes: Mixing mode 1: Under the condition that the temperature of the metaaluminate solution is from room temperature to 90° C. and the stirring speed is 100-500 rpm, the completely dissolved lithium salt solution can be added to the metaaluminate solution through a peristaltic pump with a flow rate of 0.02-5 L/min, where the amount of the lithium salt solution added may be 0.05-2.6 L per liter of the metaaluminate solution. The mixture is stirred after the mixing is complete. In the stirring, a stirring speed is 100-500 rpm, and a stirring time is 30-120 min. Mixing mode 2: Under the condition that the temperature of the lithium salt solution is from room temperature to 90° C. and the stirring speed is 100-500 rpm, the completely dissolved metaaluminate solution can be added to the lithium salt solution through a peristaltic pump with a flow rate of 0.02-5 L/min, where the amount of the metaaluminate solution added may be 0.38-20 L per liter of the lithium salt solution. The mixture is stirred after the mixing is complete. In the stirring, a stirring speed is 100-500 rpm, and a stirring time is 30-120 min. Mixing mode 3: The lithium salt solution and the metaaluminate solution are mixed in a co-current manner with a flow rate of 0.02-5 L/min. The flow rates of the lithium salt and the metaaluminate are calculated according to a mixing reaction in which the molar ratio of Li in the lithium salt to Al in the metaaluminate is 1-1.3:2.

According to some embodiments of the disclosure, in the step S1, the concentration of the lithium salt solution is 0.5-5 mol/L, in some embodiments, the concentration of the lithium salt solution is 4-5 mol/L. The concentration of the metaaluminate solution is 0.5-2 mol/L, in some embodiments, the concentration of the metaaluminate solution is 1.5-2 mol/L. The molar ratio of Li in the lithium salt to Al in the metaaluminate is 1-1.3:2.

When the lithium salt solution is added to the metaaluminate solution, the metaaluminate solution is stirred at 100-500 rpm, the lithium salt solution is added with a flow rate of 0.02-5 L/min, and the amount of the lithium salt solution added may be 0.05-2.6 L per liter of the metaaluminate solution.

When the metaaluminate solution is added to the lithium salt solution, the lithium salt solution may be stirred at 100-500 rpm, the metaaluminate solution is added with a flow rate of 0.02-5 L/min, and the amount of the metaaluminate solution added may be 0.38-20 L per liter of the lithium salt solution.

According to some embodiments of the disclosure, in the first stirring, a stirring time is 30-120 min, a stirring speed is 100-500 rpm, and a stirring temperature is 10 to 90° C., and in some embodiments, the stirring temperature is 40-60° C.

According to some embodiments of the disclosure, in the first aging, an aging temperature is 5-30° C., and an aging time is 1-12 h, and in some embodiments, the aging time is 1-2 h.

According to some embodiments of the disclosure, in the first filtration, a mesh number of a filter cloth is 1000-5000, and a negative pressure of the first filtration is 0.04-0.07 MPa.

According to some embodiments of the disclosure, the method may further include: performing 1 to 3 cycles of washing-filtration with a residue obtained from the first filtration before mixing the residue obtained from the first filtration with the acid; and/or performing 1 to 3 cycles of washing-filtration with the residue obtained from the second filtration before performing the cycle of pre-desorption and filtration.

According to some embodiments of the disclosure, the cycle of washing-filtration includes a first washing and a fourth filtration performed in sequence; the first washing is accompanied with stirring; in the first washing, a washing temperature is 5-30° C., a washing time is 3-15 min, a stirring speed is 100-300 rpm, a weight ratio of the residue obtained from the first filtration to pure water is 1:5-50; in the fourth filtration, a mesh number of a filter cloth is 1000-5000, and a negative pressure of the fourth filtration is 0.04-0.07 MPa. In the disclosure, the cycle of washing-filtration can make the synthesized adsorbent have low content of impurities such as sodium and potassium, and low content of H+ and OH−, and make the adsorbent basically neutral, to prevent the adsorbent from being too acidic or alkaline.

According to some embodiments of the disclosure, in the step S2, the concentration of the acid is 0.5-3 mol/L.

According to some embodiments of the disclosure, in the second stirring, a stirring time is 30-120 min, and a stirring speed is 100-500 rpm.

According to some embodiments of the disclosure, in the second aging, an aging temperature is 5-30° C., and an aging time is 1-12 h, and in some embodiments, the aging time is 11-12 h.

According to some embodiments of the disclosure, in the second filtration, a mesh number of a filter cloth is 1000-5000, and a negative pressure of the second filtration is 0.04-0.07 MPa.

In the disclosure, the adsorbent precursor is generated from the lithium salt and the metaaluminate through a one-step method, which has a high conversion rate and is easy to control. The adsorbent with good adsorption performance can be produced in a short period of time, and the production efficiency is high.

According to some embodiments of the disclosure, disclosure through the control of temperature, stirring speed, and stirring time of the cycle of washing-filtration can prevent desorption of lithium ions from $LiOH \cdot 2Al(OH)_3 \cdot nH_2O$ (n being 1-3) or $LiCl \cdot 2Al(OH)_3 \cdot nH_2O$ (N being 1-3), thereby avoiding structural damage. The temperature and time of the aging can also prevent desorption of lithium ions from $LiOH \cdot 2Al(OH)_3 \cdot nH_2O$ (n being 1-3) or $LiCl \cdot 2Al(OH)_3 \cdot nH_2O$ (N being 1-3), thereby avoiding structural damage. After the aging, the incompletely reacted components in the mother liquor can be fully reacted, the suspended matter settles, and the dissolution of small particles promotes the growth of large particles, making the particle size distribution more uniform.

According to some embodiments of the disclosure, in the step S3, the cycle of pre-desorption and filtration comprises pre-desorption and a third filtration performed in sequence, wherein in the pre-desorption, a weight ratio of the residue obtained from the second filtration to pure water for pre-desorption is 1:5-100, the pre-desorption is accompanied with stirring, a pre-desorption temperature is 30-50° C., a pre-desorption time is 2-6 h, and a stirring speed is 100-500 rpm.

According to some embodiments of the disclosure, in the third filtration, the mesh number of the filter cloth is 1000-5000 meshes, and a negative pressure of the third filtration is 0.04-0.07 MPa.

According to some embodiments of the disclosure, a lithium desorption rate of the cycle of pre-desorption and filtration is 50-80%.

According to some embodiments of the disclosure, the residue $LiCl \cdot 2Al(OH)_3 \cdot nH_2O$ (where n is an integer from 1 to 3) obtained from the second filtration is in the full lithium state, and lithium in the obtained residue can be eluted by the pre-desorption, to form lithium vacancies, thereby providing the ability to adsorb lithium. The control of pre-desorption time can prevent the lithium desorption rate from being too low to affect the full release of the adsorption capacity of the adsorbent, and can also prevent the lithium desorption rate from being too high to damage the structure of the adsorbent and lead to loss of the adsorption capacity.

According to some embodiments of the disclosure, the method further includes: drying a residue obtained from the cycles of the pre-desorption and filtration.

According to some embodiments of the disclosure, in the drying, a drying temperature is 70-90° C., and a drying time is 120-180 min.

According to some embodiments of the disclosure, the drying may be performed using a blast drying oven. The adsorbent is ground or air crushed after drying to eliminate powder compaction and make the particles finer and more uniform.

According to some embodiments of the disclosure, the disclosure provides a method for preparing a lithium ion adsorbent, including the following steps:

S1, adding a lithium salt solution with a concentration of 0.5-5 mol/L to a metaaluminate solution with a concentration of 0.5-2 mol/L with a flow rate of 0.02-5 L/min per liter of the metaaluminate solution with stirring at 100-500 rpm; or adding a metaaluminate solution with a concentration of 0.5-2 mol/L to a lithium salt solution with a concentration of 0.5-5 mol/L with a flow rate of 0.02-5 L/min per liter of the lithium salt solution with stirring at 100-500 rpm; performing a first stirring for 30-120 min at a stirring speed of 100-500 rpm and a temperature of 10 to 90° C., performing a first aging for 1-12 h at a temperature of 5-30° C., and performing a first filtration under the condition that a mesh number of a filter cloth is 1000-5000 meshes and a negative pressure of the first filtration is 0.04-0.07 MPa, to obtain a precursor containing a material having a chemical formula of $LiOH \cdot 2Al(OH)_3 \cdot nH_2O$, where n is an integer from 1 to 3.

S2, treating the residue obtained from the first filtration by 1 to 3 cycles of washing-filtration, where the cycle of washing-filtration includes a first washing and a fourth filtration performed in sequence, and after the first washing is performed on the residue obtained from the first filtration at a weight ratio of the residue to pure water being 1:5-50 and at a temperature of 30-50° C. and a stirring speed of 100-300 rpm for 3-15 min, the fourth filtration is performed under the condition that a mesh number of a filter cloth is 1000-5000 meshes and a negative pressure of the fourth filtration is 0.04-0.07 MPa; mixing the precursor having been subjected to the cycles of washing-filtration with an acid and controlling the amount of the acid added so that the pH of the mixture is 6.0-7.0; performing a second stirring for 30-120 min at a stirring speed of 100-500 rpm, performing a second aging for 1-12 h at a temperature of 5-30° C., and performing a second filtration under the condition that a mesh number of a filter cloth is 1000-5000 meshes and a negative pressure of the second filtration is 0.04-0.07 MPa, to obtain a residue after the second filtration.

S3, treating the residue obtained from the second filtration by 1 to 3 cycles of washing-filtration, where the cycle of washing-filtration includes a first washing and a fourth filtration performed in sequence, and after the first washing is performed on the residue obtained from the second filtration at a weight ratio of the residue to pure water being 1:5-50 and at a temperature of 30-50° C. and a stirring speed of 100-300 rpm for 3-15 min, the fourth filtration is performed under the condition that a mesh number of a filter cloth is 1000-5000 meshes and a negative pressure of the fourth filtration is 0.04-0.07 MPa; treating the residue obtained from the second filtration having been subjected to the cycles of washing-filtration by 1 to 3 cycles of pre-desorption and filtration, where the cycle of pre-desorption and filtration includes pre-desorption and a third filtration in sequence, and after the pre-desorption is performed on the residue obtained from the second filtration at a weight ratio of the residue to pure water for pre-desorption being 1:5-100 and at a temperature of 30-50° C. and a stirring speed of 100-500 rpm for 2-6 h, the third filtration is performed under the condition that a mesh number of a filter cloth is 1000-5000 meshes and a negative pressure of the third filtration is 0.04-0.07 MPa.

The disclosure is further described below through examples, but the examples are not intended to limit the disclosure.

Example 1

A lithium chloride solution (500 mL, 0.5 mol/L) was added to a sodium metaaluminate solution (1000 mL, 0.5 mol/L) through a peristaltic pump with a flow rate of 20 mL/min. A first stirring was performed at room temperature and a stirring speed of 300 rpm for 30 min, a first aging was performed at room temperature for 1 h, and a first filtration was performed to obtain a precursor. The precursor obtained by the first filtration was added to pure water at a weight ratio of the precursor to pure water being 1:5 and treated by cycles of washing-filtration. After a first washing was performed for 3 min at 300 rpm, a fourth filtration was performed to obtain the precursor. The precursor was tested by X-ray diffraction (XRD). The results show that it contains $LiAl_2(OH)_7 \cdot 1.5H_2O$. HCl (0.5 mol/L) was added to the precursor at a weight ratio of the precursor to HCl being 1:1. The pH was adjusted to 6.5. A second stirring was performed at 300 rpm for 30 min, a second aging was performed at room temperature for 1 h, and a second filtration was performed to obtain a residue after the second filtration. The residue obtained from the second filtration was added to pure water at a weight ratio of the residue to pure water being 1:5 and treated by cycles of washing-filtration. After the first washing was performed for 3 min at 300 rpm, a fourth filtration was performed to obtain a residue. The residue obtained from the fourth filtration was added to pure water at a weight ratio of the residue to pure water being 1:5. Pre-desorption was performed at 30° C. and a stirring speed of 300 rpm for 2 h. After the pre-desorption, a third filtration was performed, and the residue obtained from the third filtration was dried at 80° C. for 2 h to prepare a lithium adsorbent.

Example 2

A lithium chloride solution (50 mL, 5 mol/L) was added to a sodium metaaluminate solution (250 mL, 2 mol/L) through a peristaltic pump with a flow rate of 20 mL/min. A first stirring was performed at room temperature and a stirring speed of 300 rpm for 30 min, a first aging was performed at room temperature for 1 h, and a first filtration was performed to obtain a precursor. The precursor obtained by the first filtration was added to pure water at a weight ratio of the precursor to pure water being 1:5 and treated by cycles of washing-filtration. After a first washing was performed for 3 min at 300 rpm, a fourth filtration was performed to obtain the precursor. The precursor was tested by XRD. The results show that it contains $LiAl_2(OH)_7 \cdot 2H_2O$. HCl (0.5 mol/L) was added to the precursor at a weight ratio of the precursor to HCl being 1:1. The pH was adjusted to 6-7. A second stirring was performed at 300 rpm for 30 min, a second aging was performed at room temperature for 1 h, and a second filtration was performed to obtain a residue after the second filtration. The residue obtained from the second filtration was added to pure water at a weight ratio of the residue to pure water being 1:5 and treated by cycles of washing-filtration. After the first washing was performed for 3 min at 300 rpm, a fourth filtration was performed to obtain a residue. The residue obtained from the fourth filtration was added to pure water at a weight ratio of the residue to pure water being 1:5. Pre-desorption was performed at 30° C. and a stirring speed of 300 rpm for 2 h. After the pre-desorption, a third filtration was performed, and the residue obtained from the third filtration was dried at 80° C. for 2 h to prepare a lithium adsorbent.

Example 3

A lithium chloride solution (50 mL, 5 mol/L) was added to a sodium metaaluminate solution (250 mL, 2 mol/L) through a peristaltic pump at a flow rate with 20 mL/min. A first stirring was performed at 50° C. and a stirring speed of 300 rpm for 30 min, a first aging was performed at room temperature for 1 h, and a first filtration was performed to obtain a precursor. The precursor obtained by the first filtration was added to pure water at a weight ratio of the precursor to pure water being 1:5 and treated by cycles of washing-filtration. After a first washing was performed for 3 min at 300 rpm, a fourth filtration was performed to obtain the precursor. The precursor was tested by X-ray diffraction (XRD). The results show that it contains $LiAl_2(OH)_7 \cdot 2H_2O$. HCl (0.5 mol/L) was added to the precursor at a weight ratio of the precursor to HCl being 1:1. The pH was adjusted to 6.5. A second stirring was performed at 300 rpm for 30 min, a second aging was performed at room temperature for 1 h, and a second filtration was performed to obtain a residue after the second filtration. The residue obtained from the second filtration was added to pure water at a weight ratio of the residue to pure water being 1:5 and treated by cycles of washing-filtration. After the first washing was performed for 3 min at 300 rpm, a fourth filtration was performed to obtain a residue. The residue obtained from the fourth filtration was added to pure water at a weight ratio of the residue to pure water being 1:5. Pre-desorption was performed at 30° C. and a stirring speed of 300 rpm for 2 h. After the pre-desorption, a third filtration was performed, and the residue obtained from the third filtration was dried at 80° C. for 2 h to prepare a lithium adsorbent.

Example 4

A lithium chloride solution (50 mL, 5 mol/L) was added to a sodium metaaluminate solution (250 mL, 2 mol/L) through a peristaltic pump with a flow rate of 20 mL/min. A first stirring was performed at 50° C. and a stirring speed of 300 rpm for 30 min, a first aging was performed at room temperature for 2 h, and a first filtration was performed to obtain a precursor. The precursor obtained by the first filtration was added to pure water at a weight ratio of the precursor to pure water being 1:5 and treated by cycles of washing-filtration. After a first washing was performed for 3 min at 300 rpm, a fourth filtration was performed to obtain the precursor. The precursor was tested by XRD. The results show that it contains $LiAl_2(OH)_7 \cdot 2H_2O$. HCl (0.5 mol/L) was added to the precursor at a weight ratio of the precursor to HCl being 1:1. The pH was adjusted to 6.5. A second stirring was performed at 300 rpm for 30 min, a second aging was performed at room temperature for 12 h, and a second filtration was performed to obtain a residue after the second filtration. The residue obtained from the second filtration was added to pure water at a weight ratio of the residue to pure water being 1:5 and treated by cycles of washing-filtration. After the first washing was performed for 3 min at 300 rpm, a fourth filtration was performed to obtain a residue. The residue obtained from the fourth filtration was added to pure water at a weight ratio of the residue to pure water being 1:5. Pre-desorption was performed at 30° C. and a stirring speed of 300 rpm for 2 h. After the pre-desorption, a third filtration was performed, and the residue obtained from the third filtration was dried at 80° C. for 2 h to prepare a lithium adsorbent.

Comparative Example 1

21.2 g of anhydrous lithium chloride and 133.3 g of anhydrous aluminum chloride were dissolved in 1 L of deionized water and added to 1.5 L of 2 mol/L sodium bicarbonate solution, and reacted at 65° C. for 1 h to obtain a suspension containing $LiCl \cdot 2Al(OH)_3 \cdot nH_2O$. After solid-liquid separation, the lithium chloride was eluted with deionized water and dried at 90° C. for 12 h to obtain the adsorbent.

Comparative Example 2

156 g of 400 mesh $Al(OH)_3$ particles was added to 1 L of 1 mol/L LiOH solution, and reacted at 80° C. for 12 h, so that LiOH fully infiltrates in the gaps of $Al(OH)_3$ particles. Then 1 mol/L HCl was added to adjust the pH value of the solution to 6.5. After aging at room temperature for 24 h, $LiCl \cdot 2Al(OH)_3 \cdot nH_2O$ was prepared.

Example 5

This example is used for illustrating the results of the adsorption performance test.

A lithium-containing brine with a high magnesium-to-lithium ratio was tested. The $Li^+$ concentration was 0.02333 w.t. %, the $Mg^{2+}$ concentration was 7.8540 w.t. %, and the mass ratio of magnesium to lithium in the brine was 337:1. 10 g of adsorbent was weighed. Adsorption was performed at a ratio of the adsorbent to the brine being 1:50 at room temperature and a stirring speed of 300 rpm for 90 min. After the adsorption, rinsing and filtration under suction were performed at the same time. The amount of water used for rinsing was 250 mL. After the rinsing, desorption was performed with pure water at a solid-liquid ratio of 1:10, with the stirring speed being 300 rpm, the temperature being 35° C., and the desorption time being 60 min. The measured adsorption capacity is the working adsorption capacity of the adsorbent.

Table 1 shows data about the specific surface area, pore size, pore volume and particle size of the adsorbents synthesized in Examples 1, 2, 3, and 4 and Comparative Examples 1 and 2.

TABLE 1

| Experiments | Specific surface area m²/g | Average pore diameter nm | Total pore volume mL/g | D10 μm | D50 μm | D90 μm |
|---|---|---|---|---|---|---|
| Example 1 | 20.0186 | 31.0194 | 0.1541 | 10.61 | 21.86 | 37.91 |
| Example 2 | 24.6470 | 27.9953 | 0.1725 | 6.90 | 18.49 | 32.27 |
| Example 3 | 34.7464 | 23.2121 | 0.2885 | 3.90 | 15.28 | 28.01 |
| Example 4 | 35.0770 | 22.0413 | 0.3198 | 6.19 | 12.06 | 20.73 |
| Comparative Example 1 | 22.6013 | 28.6004 | 0.1671 | 9.23 | 22.86 | 43.67 |
| Comparative Example 2 | 14.0770 | 34.0413 | 0.1198 | 32.90 | 38.49 | 52.27 |

The adsorbents synthesized in Examples 1-4 are of a large specific surface area, small pore size, large total pore volume, high porosity, and uniform particle size distribution. Compared with Example 1, in Example 2, the concentration of reactants in the mixing precipitation reaction is increased, and the synthesized adsorbent is of an increased specific surface area and reduced particle size. Compared with Example 2, in Example 3, the temperature of the precipitation reaction is increased, and the adsorbent is of a further reduced particle size, an increased specific surface area, a reduced pore size, an increased total pore volume, and an increased porosity. Compared with Example 3, in Example 4, the aging time is prolonged, and a more uniform particle size distribution is achieved. In the case that the concentration of the lithium salt solution is 4-5 mol/L, the concentration of the metaaluminate solution is 1.5-2 mol/L, the temperature of the first stirring is 40-60° C., and the time of the first aging is 1-2 h, and the time of the second aging is 11-12 h, the adsorbent is of a more preferable specific surface area, particle size, pore size, total pore volume, porosity and particle size distribution. The specific surface area, pore size and porosity of the adsorbent synthesized in Comparative Example 1 are similar to those in Example 2, but the uniformity of particle size distribution in Comparative Example 1 is poor. The adsorbent synthesized in Comparative Example 2 is of a small specific surface area, a large pore size, and a low porosity, and its particle size and particle size distribution are greatly affected by the raw material $Al(OH)_3$.

Table 2 shows data about the post-adsorption $Li^+$ concentration (w.t. %), $Li^+$ adsorption capacity (mg/g), $Li^+$ concentration in desorption solution (w.t. %), $Li^+$ desorption rate (%), and $Mg^{2+}$ concentration in desorption solution (w.t. %), magnesium-to-lithium ratio in desorption solution, and adsorption capacity after 50 cycles (mg/g) of the adsorbents synthesized in Examples 1, 2, 3, and 4 and Comparative Examples 1 and 2.

TABLE 2

| Experiments | Post-adsorption Li+ concentration (w.t. %) | Li+ adsorption capacity (mg/g) | Li+ concentration in desorption solution (w.t. %) | Li+ desorption rate (%) | Mg2+ concentration in desorption solution (w.t. %) | Magnesium-to-lithium ratio in desorption solution | Adsorption capacity after 50 cycles (mg/g) |
|---|---|---|---|---|---|---|---|
| Example 1 | 0.0129 | 6.63 | 0.0659 | 98.89 | 0.6123 | 9.2914 | 6.41 |
| Example 2 | 0.0118 | 7.33 | 0.0726 | 98.62 | 0.5689 | 7.8361 | 7.16 |
| Example 3 | 0.0099 | 8.53 | 0.0843 | 98.40 | 0.5129 | 6.0842 | 8.28 |
| Example 4 | 0.0078 | 9.85 | 0.0976 | 98.60 | 0.5068 | 5.1926 | 9.62 |
| Comparative Example 1 | 0.0151 | 5.24 | 0.0501 | 95.09 | 0.4158 | 8.2994 | 4.79 |
| Comparative Example 2 | 0.0172 | 3.92 | 0.0327 | 83.06 | 0.5341 | 16.3333 | 3.64 |

The adsorbents synthesized in Examples 1-4 are of high adsorption-desorption efficiency, large adsorption capacity, high lithium selectivity, stable adsorbent structure, and good cycle stability. Through the comparison between Examples 1, 2, 3 and 4, the results show that increasing the concentration of the reactants in the precipitation reaction, increasing the temperature of the precipitation reaction, and prolonging the aging time can increase the specific surface area and porosity of the adsorbent and reduce the pore size, thereby improving the adsorption capacity and lithium selectivity. In the case that the concentration of the lithium salt solution is 4-5 mol/L, the concentration of the metaaluminate solution is 1.5-2 mol/L, the temperature of the first stirring is 40-60° C., and the time of the first aging is 1-2 h, and the time of the second aging is 11-12 h, the adsorbent is of a more preferable adsorption capacity, lithium selectivity, structural stability and cycle stability. The adsorption capacities of the adsorbents synthesized in Comparative Example 1 and Comparative Example 2 are low, and the desorption efficiency and the lithium selectivity of Comparative Example 2 are low.

The exemplary implementations of the disclosure are described in detail above with reference to the accompanying drawings, but the disclosure is not limited to the specific details in the above implementations. Various simple variations may be made to the technical solutions of the disclosure within the scope of the technical spirits of the disclosure, and such simple variations shall fall within the protection scope of the disclosure.

It should be further noted that the specific technical features described in the above specific embodiments may be combined in any suitable manner without contradiction. To avoid unnecessary repetition, various possible combinations are not further described in the disclosure.

In addition, different implementations of the disclosure may also be arbitrarily combined without departing from the spirits of the disclosure, and these combinations shall still be regarded as content disclosed in the disclosure.

What is claimed is:

1. A lithium ion adsorbent, comprising: a material having a chemical formula of $LiCl \cdot 2Al(OH)_3 \cdot nH_2O$, wherein:
n is an integer from 1 to 3;
   a specific surface area of the lithium ion adsorbent is 20-36 $m^2/g$;
   an average pore diameter of the lithium ion adsorbent is 20-35 nm;
   a total pore volume of the lithium ion adsorbent is 0.15-0.32 mL/g;
   a D10 of the lithium ion adsorbent is 3-12 μm;
   a D50 of the lithium ion adsorbent is 12-22 μm; and
   a D90 of the lithium ion adsorbent is 20-40 μm.

2. The lithium ion adsorbent of claim 1, wherein:
the specific surface area of the lithium ion adsorbent is 33-36 $m^2/g$;
the average pore diameter of the lithium ion adsorbent is 22-24 nm;
the total pore volume of the lithium ion adsorbent is 0.28-0.32 mL/g;
the D10 of the lithium ion adsorbent is 3-6 μm;
the D50 of the lithium ion adsorbent is 12-16 μm; and
the D90 of the lithium ion adsorbent is 20-29 μm.

3. The lithium ion adsorbent of claim 1, wherein:
a lithium ion adsorption capacity of the lithium ion adsorbent is 3-10 mg/g;
a lithium ion desorption rate of the lithium ion adsorbent is 95-100%;
when the lithium ion adsorbent is used for adsorbing lithium ions in a brine including magnesium and lithium, a ratio of a mass ratio of magnesium to lithium in the brine to a mass ratio of magnesium to lithium in a desorption solution is 18-68:1;
a content of the material having the chemical formula of $LiCl \cdot 2Al(OH)_3 \cdot nH_2O$ in the lithium ion adsorbent is 95-100% by weight.

4. A lithium ion adsorbent, comprising: a material having a chemical formula of $LiCl \cdot 2Al (OH)_3 \cdot nH_2O$, wherein:
n is an integer from 1 to 3:
   a specific surface area of the lithium ion adsorbent is 20-36 m/g;
   an average pore diameter of the lithium ion adsorbent is 20-35 nm;
   a total pore volume of the lithium ion adsorbent is 0.15-0.32 mL/g;
   a D10 of the lithium ion adsorbent is 3-12 μm;
   a D50 of the lithium ion adsorbent is 12-22 μm; and
   a D90 of the lithium ion adsorbent is 20-40 μm,
wherein;
   a lithium ion adsorption capacity of the lithium ion adsorbent is 3-10 mg/g;
   a lithium ion desorption rate of the lithium ion adsorbent is 95-100%;
   when the lithium ion adsorbent is used for adsorbing lithium ions in a brine including magnesium and lithium, a ratio of a mass ratio of magnesium to lithium in the brine to a mass ratio of magnesium to lithium in a desorption solution is 18-68:1;
   a content of the material having the chemical formula of $LiCl \cdot 2Al(OH)_3 \cdot nH_2O$ in the lithium ion adsorbent is 95-100% by weight, and
wherein:
   the lithium ion adsorption capacity of the lithium ion adsorbent is 8-10 mg/g;

the lithium ion desorption rate of the lithium ion adsorbent is 98-99%.

* * * * *